US009203467B2

(12) United States Patent
Marque-Pucheu et al.

(10) Patent No.: US 9,203,467 B2
(45) Date of Patent: Dec. 1, 2015

(54) METHOD OF MANAGEMENT FOR OPERATING A BROAD BAND COMMUNICATION SYSTEM AND A NARROW BAND COMMUNICATION SYSTEM IMPLEMENTED IN A SAME FREQUENCY BAND

(75) Inventors: Gérard Marque-Pucheu, Verneuil (FR); Philippe Mege, Bourg la Reine (FR)

(73) Assignee: CASSIDIAN SAS, Elancourt (FR)

( * ) Notice: Subject to any disclaimer, the term of this patent is extended or adjusted under 35 U.S.C. 154(b) by 379 days.

(21) Appl. No.: 13/515,439

(22) PCT Filed: Mar. 31, 2010

(86) PCT No.: PCT/EP2010/054389
§ 371 (c)(1),
(2), (4) Date: Jun. 12, 2012

(87) PCT Pub. No.: WO2011/072884
PCT Pub. Date: Jun. 23, 2011

(65) Prior Publication Data
US 2012/0250564 A1     Oct. 4, 2012

(30) Foreign Application Priority Data

Dec. 16, 2009   (FR) ...................................... 09 59064

(51) Int. Cl.
| H04W 4/00 | (2009.01) |
| H04B 1/71 | (2011.01) |
| H04W 72/08 | (2009.01) |
| H04B 1/10 | (2006.01) |
| H04W 16/14 | (2009.01) |

(52) U.S. Cl.
CPC ........... *H04B 1/7101* (2013.01); *H04W 72/082* (2013.01); *H04B 1/1036* (2013.01); *H04W 16/14* (2013.01)

(58) Field of Classification Search
None
See application file for complete search history.

(56) References Cited

U.S. PATENT DOCUMENTS 6,526,532 B1 *   2/2003   Cinkler et al. ................. 714/712
8,055,235 B1 *   11/2011  Gupta et al. ................... 455/296

(Continued)

FOREIGN PATENT DOCUMENTS

| EP | 1 739 908 A1 | 1/2007 |
| EP | 1959625 A1 * | 8/2008 |

(Continued)

OTHER PUBLICATIONS

International Search Report as issued for PCT/EP2010/054389.

*Primary Examiner* — Steven Young
(74) *Attorney, Agent, or Firm* — Pillsbury Winthrop Shaw Pittman LLP

(57) ABSTRACT

A method of management for operating a first system of communication of the broadband type communication system emitting over a first frequency range, and a second system of communication of the narrow band type communication system emitting over a second frequency range, the first system and the second system using all or part of a same frequency band, such common frequency band being called a crossover frequency band for both systems, the method including: embodying a scan operation from at least the crossover frequency band of the two systems using a scan device from the first communication system; identifying, after the scan operation, the frequency channels used by the second communication system; adapting the operating of the first communication system within the frequency channels identified as being used by the second communication system.

7 Claims, 1 Drawing Sheet

(56) References Cited

U.S. PATENT DOCUMENTS

2003/0216122 A1* 11/2003 Cordone et al. ............ 455/63.1
2006/0188003 A1*  8/2006 Larsson ....................... 375/130
2007/0291636 A1* 12/2007 Rajagopal et al. ............ 370/208

FOREIGN PATENT DOCUMENTS

EP           1 959 625 B1    2/2009
WO         WO 00/46929       8/2000

* cited by examiner

METHOD OF MANAGEMENT FOR OPERATING A BROAD BAND COMMUNICATION SYSTEM AND A NARROW BAND COMMUNICATION SYSTEM IMPLEMENTED IN A SAME FREQUENCY BAND

CROSS REFERENCE TO RELATED APPLICATIONS

This application is the U.S. National Stage of PCT/EP2010/054389, filed Mar. 31, 2010, which in turn claims priority to French Patent Application No. 0959064, filed Dec. 16, 2009, the entire contents of all applications are incorporated herein by reference in their entireties.

TECHNICAL FIELD OF THE INVENTION

The purpose of the present invention is a method of management for operating a broad band communication system and a narrow band communication system, the narrow band communication system and the broadband communication system being implemented in a same frequency band.

Generally-speaking, the two communication systems are implemented in a same frequency band if, for a given geographical zone, one of the two systems operates within a frequency band included in the frequency band used by the other system, or even if, still within a given geographical zone, the first system and the second system presents a frequency band, called a crossover frequency band of the 2 systems, used by both systems considered.

The field of the invention is, generally speaking, that of communication systems or networks, notably cellular type communication systems. In this field, on the one hand, broadband communication systems are known (for example, WIMAX or UMTS LTE systems), which require having broad frequency bands, typically superior to a Mega-Hertz. Hence, for broadband systems using WIMAX technology, the channel widths may be, for example, 5 MHz, 10 MHz, 20 MHz, 1.25 MHz. On the other hand, narrow band communication systems are known, which use a series of communication channels of relatively low spectral width, typically just a few Kilo-Hertz. Hence, for example, for TETRAPOL or TETRA systems, which are two narrow band systems, channel widths of, for example, 10 kHz, 12.5 kHz and 25 kHz, are used.

The multiplication of communication systems implemented immediately affects the frequency spectrum, which drops in supply, particularly in the UHF band below the Giga-Hertz, which is the preferred band for implementing networks with regional or national coverage in a sufficiently economic manner; indeed, in said frequency band, a good propagation of radio emissions is observed, even when using relatively low levels of emission. By consequence, these frequencies already significantly use the systems of communication of narrow band type communication systems, which already share the available frequencies. It is currently very difficult to find free frequency bands, i.e. not used by any other communication system.

TECHNOLOGICAL BACKGROUND OF THE INVENTION

In order to respond to the problems of the lack of available frequency bands, notably in the UHF band explained above, it appears interesting for broadband systems and narrow band systems to be housed within a same frequency band. Hence, by considering a broadband system with a 5 MHz channel width, whose operating would preferably be located in UHF band, it would seem interesting if, within said 5 MHz band, one or several narrow band communication systems were present. If, for example, the channel, or pipe, width of the narrow band communication systems is 12.5 kHz, this implies that 400 narrow band channels are likely to be present in a 5 MHz broadband channel, which makes the situation particularly complicated to manage. However, this situation, in reality, is much simpler, the number of narrow band channels actually used being less than the number of useable channels. Indeed, in a given place of the network coverage and at a given time, the full amount of the narrow band channels are not all used, or even, out of at least a certain number of these narrow band channels, the narrow band signal level is relatively low.

In practice, in order to respect the cellular organisation of most of the narrow band systems, a re-use factor is defined for reutilising the communication channels, which takes account of the fact that in two adjacent cells, notably, the same communication channel is not used for each of the considered cells in order to essentially reduce the risks of interference.

Hence, when considering a narrow band communication system implemented using a re-use factor of N, a number of narrow band channels used in each cell are obtained within a considered 5 MHz frequency band equal to: (5 MHz/N)/$B_{narrow\ band}$, where $B_{narrow\ band}$ corresponds to the width of the narrow band channels considered.

For example, for a re-use factor of 20, and a narrow band channel width, $B_{narrow\ band}$, of 12.5 kHz, each cell comprises (5 MHz/20)/12.5 kHz=20 narrow band channels used within the cell out of a total of 400 narrow band channels theoretically useable in the 5 MHz mode. FIG. 1 illustrates such a situation, with the narrow band channels 101 implemented within a 5 MHz frequency band 102 used by a broadband system. Even if all narrow band channels are not used, the coexistence within certain frequency ranges of broadband system signals and of narrow band system signals give rise to mutual interferences between these signals. The broadband system signals more or less interfere with each other, depending on the density of narrow band channels.

Hence, when considering the example in FIG. 1, in which 20 narrow band channels 101 are present within the 5 Mz band of the broadband channel 102, a receptor of the broadband system receives the broadband signal in addition to the twenty narrow band signals. Nevertheless, the power of these narrow band signals may be high, for example, the power of each one may be of the same type or similar to that of the broadband signal. The emission levels of mobile terminals are in fact limited, whatever the band width, notably for reasons of autonomy. In the example of FIG. 1, when considering the assumption according to which the power received for each of the narrow band channels is equal to, or near to, that received for a broadband signal, the signal ratio on interference for the broadband signal is −10*log 10 (20)=−13 dB. Such signal ratio on interference is very unfavourable and the broadband signal is most likely not to be able to be correctly processed under such conditions. These conditions, and even more difficult conditions, may be commonly encountered, for example, in the case of using, on the same location and thus on the same coverage, a broadband system and a narrow band system, or even a broadband system and several narrow band systems.

GENERAL DESCRIPTION OF THE INVENTION

The purpose of the invention is to propose a solution to the problems just explained. Generally-speaking, the invention essentially proposes an improvement of the signal ratio over interference for the broadband signal when in the presence of several narrow band communications within the same frequency band. In the invention, the broadband network is proposed as satisfactorily working when in presence of interferences due to narrow band signals. Indeed, the present invention symmetrically proposes a protection of the narrow band network (or networks) in presence of interferences due to broadband signals. In order to attain such targets, a scan operation is notably proposed in the invention, via the broadband system, of the channels likely to be used by the narrow band system or systems present within the band, in order to determine an effective use or not of the said narrow band channels by the narrow band system.

The invention thus essentially concerns a method of management for operating a first system of communication of the broadband type communication system emitting over a first frequency range, and at least a second system of communication of the narrow band type communication system emitting over a second frequency range, the first system and the second system or systems using all or part of a same frequency band, such common frequency band being called a crossover frequency band for both systems, characterised in that it comprises the following different steps consisting of:
    embodying a scan operation from at least the crossover frequency band of the 2 systems by means of a scan device of the first communication system;
    identifying, following the scan operation, the frequency channels used by the second communication system;
    adapting the operating of the first communication system within the frequency channels identified as being used by the second communication system.

Besides the main characteristics just mentioned in the previous paragraph, the method according to the invention may represent one or several additional characteristics from among those described hereafter.

The method may comprise the step, prior to the scan operation, consisting of transmitting, from the second communication system towards the first communication system, data relating to the frequency channels used by the second communication system. The data relating to the frequency channels used by the second communication system may comprise initial datum relating to a central frequency of a first frequency channel used by the second communication system, and/or second datum relating to the width of the frequency channels used by the second communication system.

In a particular embodiment, the scan operation is embodied successively for each of the frequency channels defined by the initial datum and/or the second datum for the data relating to the frequency channels used by the second communication system.

The identification step of the frequency channels used by the second communication system may comprise different operations consisting of:
    measuring the power received within a communication channel considered as likely to be used by the second communication system;
    comparing the measured power received within a considered communication channel having a received mean power value within the first frequency range;
    identifying the considered communication channel as a frequency channel used by the second communication system if the received measured power exceeds the mean power value received within the whole band on which has been performed the scan, said mean power value being weighted by an adjusting factor.

The identification step of the frequency channels used by the second communication system may comprise different operations consisting of:
    measuring the power received within a communication channel considered as likely to be used by the second communication system;
    comparing the measured power received within a considered communication channel having a previously determined power threshold;
    identifying the considered communication channel as a frequency channel used by the second communication system if the received measured power exceeds the previously determined power threshold.

The step consisting of adapting the operating of the first communication system may comprise an operation consisting of minimising the signals received on the frequency channels identified as being used by the second communication system. The expression "minimise the signals received" indicates the fact that the largest part of the considered signals is not taken into account, or even that the portion of the energy taken within the considered signal received is reduced. Hence, the influence of these signals is minimised. In a first option, this operation may be performed, notably on the portion of the signal carrying synchronisation data. In a second option, this operation may be performed, notably on the portion of the signal carrying signalling data.

In a particular embodiment, this operation performed on the signal received from the first communication system consists of embodying a rejector or attenuator filtering on the signals received within the frequency channels identified as being used in the second communication system. In this case, if a synchronisation operation is performed on the signal received, said synchronisation operation may be embodied by comparing the received filtered signals with an expected synchronisation sequence filtered for the purpose of rejecting the narrow band channels corresponding to the frequency channels identified as being used in the second communication system.

The step consisting of adapting the operating of the first communication system may comprise an operation consisting of reducing the power of the signals emitted by the first communication system within the frequency bands corresponding to the frequency channels identified as being used by the second communication system. In a particular embodiment, this operation consists of filtering the broadband signal to be emitted by means of a rejector or attenuator filter within the frequency channels identified as being used in the second communication system, then to emit said filtered broadband signal.

The present invention also refers to a telecommunications device able to implement the method, according to the invention, of management for operating a first system of communication of the broadband type communication system emitting over a first frequency range, and at least a second system of communication of the narrow band type communication system emitting over a second frequency range, the first system and the second system using all or part of a same frequency band, characterised in that said device comprises:
    a first appliance for embodying a scan operation from at least the crossover frequency band of the 2 systems;
    means for identifying the frequency channels used by the second communication system;
    a second appliance for adapting the operating of the first communication system within the frequency channels identified as being used by the second communication system.

The device according to the invention comprises either a first appliance and a second appliance which are a single apparatus, of the base station or mobile terminal type; alternatively, the device according to the invention comprises a first appliance and a second appliance which are separate, of the base station or mobile terminal type, the first appliance comprising means of transmission for transmitting datum relating to the frequency channels, identified as being used by the second communication system, to the second appliance.

The invention and its different applications will be better understood upon reading the following description and after studying the figures attached thereto.

It is supposed hereafter that the broadband system occupies a 5 MHz frequency band.

BRIEF DESCRIPTION OF THE FIGURES

These are only shown as examples and should not be considered as complete with regard to the invention. The figures show.

DETAILED DESCRIPTION OF THE PREFERRED EMBODIMENTS OF THE INVENTION

Figure 1:
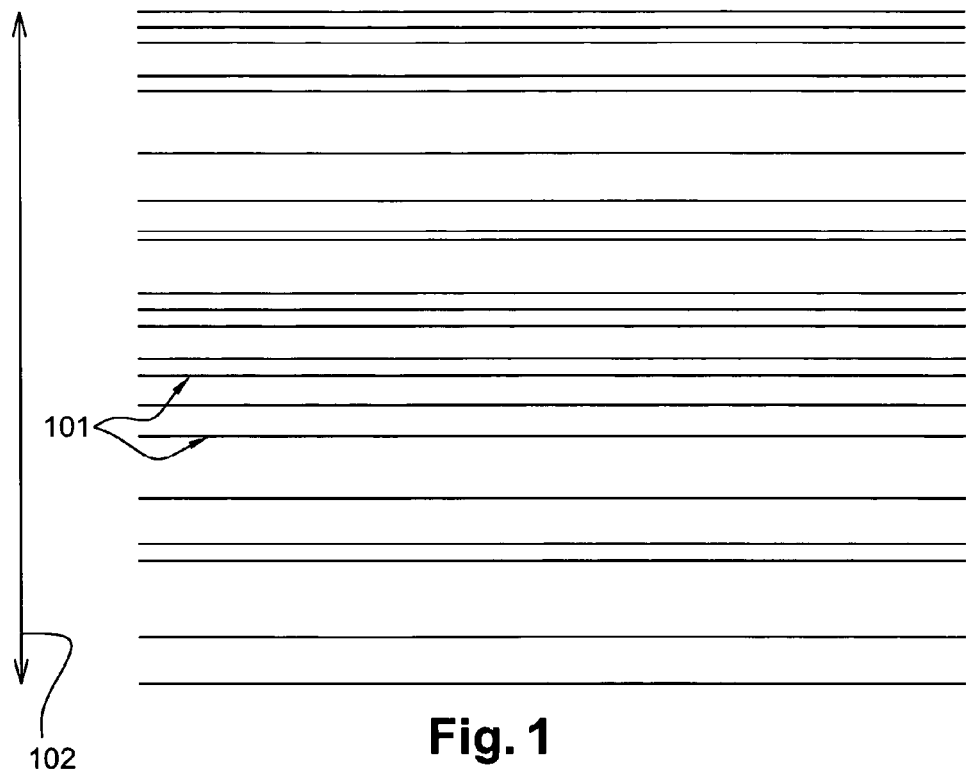
in FIG. 1, already described, a sketch illustrating how a broadband system and a narrow band system are implemented in a same frequency band.
Figure 2:
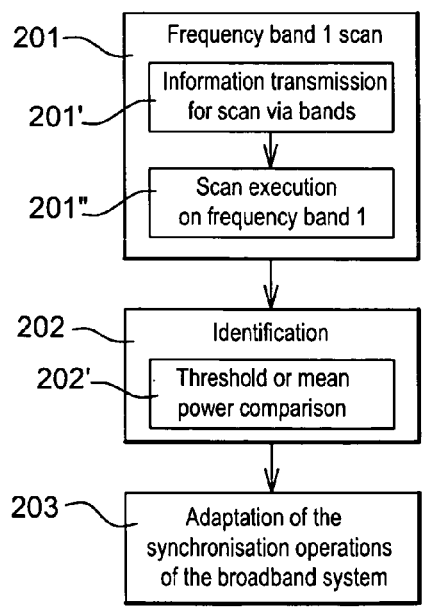
in FIG. 2, a flow chart illustrating a first implementation example of the method according to the invention.
Figure 3:
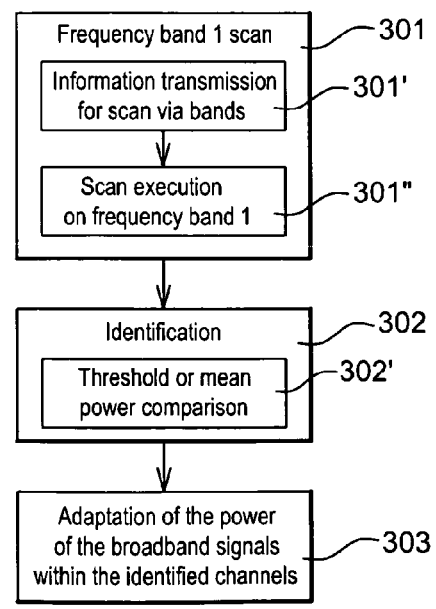
in FIG. 3, a flow chart illustrating a second implementation example of the method according to the invention.

The context of FIGS. 2 and 3 is that of implementation within a same frequency band of a first system of communication of the broadband type communication system, operating within a first frequency band, and a second system of communication of the narrow band type communication system, operating within a second frequency band.

FIG. 2 illustrates, by means of a flow chart, a first implementation example of the method according to the invention.

In a first step 201, a scan operation of the first frequency range is performed by means of a scan device of the first communication system; a scan operation consists, by means of known sensors, of determining, for a given frequency range, the possible presence of signals within the considered frequency range.

The interferences due to the narrow band channels vary according to the position of a terminal being covered by the broadband network. Indeed, the narrow band channels used in a cell of the narrow band system are not the same as those used in another cell, since many of the narrow band systems implemented are cellular type communication systems. The scan operation thus enables, for each cell of a considered communication network of the second communication system, to select the narrow band channels likely to be used.

Appropriately—hence, referring to scan via bands—prior to starting the scan operation, an initial operation 201' is performed consisting of supplying datum to the broadband system on the width and the position of the narrow band channels likely to be used in the second communication system. The information supplied may, for example, consist of the central frequency of the first narrow band channel by departing from the lowest frequency of the broadband channel, and/or of the band width of the channels used in the narrow band system. By operating with a scan via bands adapted to the characteristics of the narrow band channels of the second communication system, the scan operation is faster and simpler to implement. Once the initial operation 201' is performed, an operation 201" is then carried out during which the scan operation on the first frequency band is actually embodied.

In a second step 202, identification is performed by using the results of the scan operation, the frequency channels actually used by the second communication system; in a particular embodiment of the present invention, the broadband system deciphers the presence of a narrow band signal within a given frequency band by measuring the power received in said channel and by embodying a comparison 202' with the mean power received, possibly weighted by an adjustment factor, within the whole of the broadband divided by the $B_{broadband}/B_{narrow\ band}$ ratio, where $B_{broadband}$ is the width of the first frequency band, and where $B_{narrow\ band}$ is the width of the frequency channel likely to be used in the second communication system. In another embodiment variant, the comparison 202' is embodied with a previously determined fixed power threshold;

The step 202 enables to determine which narrow band channels are actually used, within a considered cell, for the transmission of signals by the second communication system within the first frequency band.

In a subsequent step 203, an adaptation operation is performed for the operating of the first communication system within the frequency channels identified as being used by the second communication system. In the first embodiment example described, the adaptation operation consists of minimising the signals received within the channels identified in the previous step. The adaptation performed essentially aims to optimise certain operations of the first communication system, and essentially the operations bringing into action the components of the broadband signal that effectively occupy the whole of the band; among such operations are notably found synchronisation operations on the broadband signal received or operations for receiving signalling data. Indeed, among the components of the broadband signal, for example of the WIMAX type, the synchronisation sequence and the signalling data are particularly important, the receptors of such communication systems having to be synchronised, no demodulation operation of the data received being possible if said receptors are not synchronised. In general, such data is transmitted across the whole of the 5 MHz band and for a limited period (a few OFDM symbols). Other data, notably traffic information, may only be transmitted across a portion of the band or by excluding certain parts.

Hence, in this example, different methods for embodying the synchronisation of the first communication system may be envisaged:

according to a first method, a rejector or attenuator filtering is applied to the signal received within the corresponding narrow band channels. Synchronisation is then performed on this filtered signal received. This same filtered signal received may then be used to process, and notably to demodulate, for example, the signalling data transmitted when using the whole of the band of the broadband signal.

according to a second method, the rejection of the detected narrow band channels present is performed by embodying the synchronisation on the broadband signal received (across the whole of the band) via correlation with an expected previously filtered synchronisation sequence for the purpose of rejecting or attenuating the corresponding narrow band channels. Hence, in this case, the correlation itself initiates rejection of the channels scrambled by the broadband signals.

FIG. 3 illustrates, by means of a flow chart, a second implementation example of the method according to the invention.

In a first step 301, identical to step 201 of the first example, a scan operation of the first frequency range is performed by means of a scan device of the first communication system; a scan operation consists, by means of known sensors, of determining, for a given frequency range, the possible presence of signals within the considered frequency range.

In this example, appropriately, an initial operation 301' is performed consisting of supplying datum to the broadband system on the width and the position of the narrow band channels likely to be used in the second communication system. The datum supplied may, for example, consist of the central frequency of the first narrow band channel by departing from the lowest frequency of the broadband channel, and/or of the band width of the channels used in the narrow band system. Once the initial operation 301' is performed, an operation 301" is then carried out during which the scan operation on the first frequency band is actually embodied.

In a second step 302, identical to the step 202 of the first example, identification is performed by using the results of the scan operation, the frequency channels actually used by the second communication system; there again, in a particular embodiment of the present invention, the broadband system deciphers the presence of a narrow band signal within a given frequency band by measuring the power received in said channel and by embodying a comparison 302' with the mean power received, possibly weighted by an adjustment factor, within the whole of the broadband divided by the $B_{broadband}/B_{narrow\ band}$ ratio, where $B_{broadband}$ is the width of the first frequency band, and where $B_{narrow\ band}$ is the width of the frequency channel likely to be used in the second communication system. In another embodiment variant, the comparison is embodied with a previously determined fixed power threshold;

The step 302 enables to determine which narrow band channels are actually used, within a considered cell, for the transmission of signals by the second communication system within the first frequency band.

In a subsequent step 303, an adaptation operation is performed for the operating of the first communication system within the frequency channels identified as being used by the second communication system. In the second embodiment example described, the adaptation performed aims to protect the signals of the narrow band system from the interferences created by the broadband signals. This is notably applied, though not exclusively, to the emission on the descending route (Base Station towards Mobile Station). Hence it is planned, in the step 303, that the broadband system performs, prior to emission, a processing of the broadband signal to be emitted consisting of reducing the power emitted within its communication channels and, for example, its emission channels (descending route), corresponding to the narrow band channels identified as being used in the second communication system during the previous step in order to reduce the interferences created on the narrow band channels used in the zone considered.

In the case where a receptor of the first communication system is equipped with several antenna, the scan of the narrow band channels is performed by measuring, for each narrow band channel, the power received on each antenna. Then, for each narrow band channel, the powers received on the different antenna are added on, and it is this overall power that is used for deciding whether the narrow band channel is occupied or not by the narrow band system. Rejection of the corresponding narrow band channels may then be performed by temporal and spatial filtering by combining the signals of the different antenna.

In advantageous embodiments of the invention, the scan operations 201 and 301 draw benefit due to the fact that in most narrow band systems, the channels are of the dual type: in such systems, the channels are linked, one ascending and the other descending. In most cases, the frequency gap between these two channels (ascending and descending) is fixed (known as the "duplex gap"). Hence, in such a configuration, the operations of scan 201 and 301 may consist of:
  scanning the two associated channels (ascending and descending);
  or even;
  scanning only one of the two channels, the ascending or the descending channel.

Following the scan operation, if the ascending channel, respectively the descending channel, has been identified as being occupied by a narrow band system, it is supposed that the corresponding descending channel, respectively the ascending channel (distant from the ascending channel, respectively the descending channel, by a duplex gap) is also occupied, and this without even performing a scan of this descending channel, respectively ascending. The adaptation process of the system's operating is then implemented in the manner described when referring to FIGS. 2 and 3, with, for example, implementation of the adaptation steps of the synchronisation operations of the broadband system or the adaptation steps of the power of the broadband signals within the identified channels.

The different implementation examples of the method according to the invention just described are implemented by means of a communication device, said device being constituted either of a single apparatus, of the base station or mobile terminal type, implementing together all the operations described, i.e. a first appliance and a second appliance, one of the appliances being a base station and the other appliance a mobile terminal, each undergoing the different steps of the method according to the invention.

The invention claimed is:

1. A method of management for operating a first system of communication of the broadband type communication system for emitting over a first frequency range, and a second system of communication of the narrow band type communication system for emitting over a second frequency range, the first system and the second system using all or part of a same crossover frequency band, the method comprising:
  transmitting, from the second communication system towards the first communication system, data relating to the frequency channels used by the second communication system, said data comprising initial datum relating to a central frequency of a first frequency channel used by the second communication system, and/or second datum relating to a width of the frequency channels used by the second communication system;
  performing, using a scan device of the first communication system, a scan operation of at least the crossover frequency band of the first and second communication systems, said scan operation being performed successively for each of the frequency channels defined by the initial datum and/or the second datum for information relating to the frequency channels used by the second communication system;

identifying, following the scan operation, frequency channels used by the second communication system, by:
  measuring the power received within a communication channel considered as likely to be used by the second communication system;
  comparing the measured power received within a considered communication channel with a received mean power value within the first frequency range;
  identifying the considered communication channel as a frequency channel used by the second communication system if the received measured power exceeds the received mean power value within the overall range on which is performed the scan, said mean power value being weighted by an adjusting factor, and
adapting an operating of the first communication system within the frequency channels identified as being used by the second communication system, said adapting comprising
  performing a synchronization operation on a broadband signal associated with the first communication system and received across the entire crossover frequency band via correlation with an expected previously filtered synchronization sequence on the broadband signal for the purpose of rejecting or attenuating the corresponding frequency channels used by the second communication system.

2. A method according to claim 1, wherein identifying the frequency channels used by the second communication system comprises:
  comparing the measured power received within a considered communication channel with a previously determined power threshold;
  identifying the considered communication channel as a frequency channel used by the second communication system if the received measured power exceeds the previously determined power threshold.

3. A telecommunications device configured to implement the method, according to claim 1, said telecommunications device comprising:
  a first device configured to perform a scan operation of at least the crossover frequency band of the first and second communication systems;
  a frequency channel identifier configured to identify the frequency channels used by the second communication system and
  a second device configured to adapt the operating of the first communication system within the frequency channels identified as being used by the second communication system by performing a synchronization operation on a broadband signal associated with the first communication system and received across the entire crossover frequency band via correlation with an expected previously filtered synchronization sequence for the purpose of rejecting or attenuating the corresponding frequency channels used by the second communication system.

4. A communication device according to claim 3, wherein the first device and the second device are a mobile terminal or a base station.

5. A communication device according to claim 3, wherein the first device and the second device are a separate apparatus, the first device comprising a transmitter configured to transmit datum relating to the frequency channels, identified as being used by the second communication system, to the second device.

6. A communication device according to claim 5, wherein the first device and the second device are a mobile terminal or base station.

7. A method for operating a first broadband communication system for emitting over a first frequency range, and a second narrow band communication system for emitting over a second frequency range, the first broadband communication system and the second narrow band communication system using all or part of a same crossover frequency band, the method comprising:
  transmitting, from the second communication system towards the first broadband communication system, data relating to the frequency channels used by the second narrow band communication system, said data comprising initial datum relating to a central frequency of a first frequency channel used by the second narrow band communication system, and/or second datum relating to a width of the frequency channels used by the second narrow band communication system;
  performing, with a scan device of the first broadband communication system, a scan operation of the crossover frequency band used by the first broadband communication system and the second narrow band communication system, said scan operation being performed successively for each of the frequency channels defined by the initial datum and/or the second datum for information relating to the frequency channels used by the second narrow band communication system;
  identifying, following the scan operation, frequency channels used by the second narrow band communication system by:
    measuring the power received within a communication channel considered as likely to be used by the second narrow band communication system;
    comparing the measured power received within a considered communication channel with a received mean power value within the first frequency range;
    identifying the considered communication channel as a frequency channel used by the second narrow band communication system if the received measured power exceeds the received mean power value within the overall range on which is performed the scan, said mean power value being weighted by an adjusting factor, and
  adapting an operating of the first broadband communication system within the frequency channels identified as being used by the second narrow band communication system, said adapting comprising
    correlating a synchronization operation between a receiver and a broadband signal, associated with the first broadband communication system and emitted across the entire crossover frequency band, with an expected previously filtered synchronization sequence on the broadband signal for the purpose of rejecting or attenuating the frequency channels used by the second narrow band communication system.

* * * * *